US007546297B2

(12) United States Patent
Moulhaud et al.

(10) Patent No.: US 7,546,297 B2
(45) Date of Patent: Jun. 9, 2009

(54) STORAGE APPLICATION PROGRAMMING INTERFACE

(75) Inventors: Patrick E. Moulhaud, Seattle, WA (US); Suresh Kannan, Bellevue, WA (US); Pak H Ko, Kirkland, WA (US); Paul A. Elliott, Woodinville, WA (US); Stephen P Rosato, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 11/079,462

(22) Filed: Mar. 14, 2005

(65) Prior Publication Data

US 2006/0206510 A1    Sep. 14, 2006

(51) Int. Cl.
  *G06F 7/00* (2006.01)
(52) U.S. Cl. .......................................................... 707/9
(58) Field of Classification Search ........................ 707/9
See application file for complete search history.

(56) References Cited

U.S. PATENT DOCUMENTS

| 2003/0131073 A1* | 7/2003 | Lucovsky et al. ............ 709/219 |
| 2003/0163479 A1* | 8/2003 | Mathews et al. ............ 707/102 |
| 2004/0225893 A1* | 11/2004 | Ng .............................. 713/200 |

* cited by examiner

*Primary Examiner*—Charles Rones
*Assistant Examiner*—Fazlul Quader
(74) *Attorney, Agent, or Firm*—Lee & Hayes, PLLC

(57) ABSTRACT

Systems, methods, apparatus, data structures, and computer-readable media are described which provide techniques for managing data storage. In an implementation, a method includes examining a role map to determine which of a plurality of roles are applicable to a request to interact with at least one of a plurality of items. The request is received via an application programming interface (API) that is available over a network and one or more of the items reference a respective item of data. Access to the at least one item is permitted based on a role definition which describes differing access rights available for the item based on which of the roles is applicable to the request.

12 Claims, 14 Drawing Sheets

STORAGE APPLICATION PROGRAMMING INTERFACE

TECHNICAL FIELD

The present invention generally relates to data storage and more particularly relates to storage systems.

BACKGROUND

Data storage has become an integral part of everyday life. For example, a user may obtain a variety of data from over a network, such as songs, email, web logs (i.e., "blogs"), movies, web pages, and so on. Additionally, the user may share this variety of data with other users, such as by providing a web page that is accessible by other users of the Internet, communicating the data during an instant messaging session, attaching the data to an email, and so forth. Further, the types of data which are available to the user are ever increasing, from photos and textual descriptions to downloadable movies and songs.

To provide this data to a plurality of such users, a service provider may provide online data storage. For example, a user may purchase a portion of the available online data storage from the service provider to store emails and so on. Accordingly, the service provider may provide a multitude of such portions to a multitude of users. Therefore, the service provider may be faced with a daunting task of managing a significant amount of data storage for the multitude of users. Further, the service provider may be faced with managing the different portions of the data storage for use by different respective clients.

Therefore, there is a continuing need for improved techniques for managing data storage.

SUMMARY

Systems, methods, apparatus, data structures, and computer-readable media are described which provide techniques for managing data storage. In an implementation, a method includes examining a role map to determine which of a plurality of roles are applicable to a request to interact with at least one of a plurality of items. The request is received via an application programming interface that is available over a network. The one or more of the items reference a respective item of data. Access to the at least one item is permitted based on a role definition which describes differing access rights available for the item based on which of the roles is applicable to the request.

In another implementation, a method includes receiving a plurality of requests at an application programming interface to access a respective one or more of a plurality of items. Each of the requests is sent over a network from a respective one of a plurality of clients, one or more said items reference at least one of a plurality of data, and at least one of the items has a defined relationship with another one of the items. One or more of the items have one or more role definitions which describe respective access rights that are defined for one or more roles. Access to the one or more items by the plurality of clients is managed based on which of the roles is applicable to a respective client.

In a further implementation, a method includes forming a request by a client for communication over a network to a storage application programming interface. The request includes a unique client identifier and identifies one or more of a plurality of items. A response to the request is received that is formed to include data referenced by the identified items which is accessible to the client based on which of a plurality of roles defined for the identified items is applicable to the client and a role definition which defines differing access rights to the identified items based on respective roles.

BRIEF DESCRIPTION OF THE DRAWINGS

The same reference numbers are utilized in instances in the discussion to reference like structures and components.

DETAILED DESCRIPTION

Overview

A storage application programming interface is described. In an implementation, a globally accessible object storage service is described that allows applications to create and persist objects natively and provides the ability to re-use these objects between various applications to enable different applications to share the objects. For example, a digital photograph may be stored in a storage device and shared by a web page and a web log (i.e., "blog") such that only a single instance of the digital photograph is stored, thereby conserving memory resources of a provider of the web page and the web log, as well as allowing the owner to re-use the same photograph in multiple places without having to upload it for every place that it is needed.

In an implementation, a fundamental object is created which is referred to as an "item". The item may include basic properties which are used by the storage service to manage the item, such as an identifier, name, type, and role definition. "Role definition" may be used to specify particular attributes of the item that a particular role may access, particular item-associated methods a particular role may call, and so on. For example, one role may be defined for an "administrator" and another role may be defined for a "guest". A role definition for the item may be configured to describe different access rights for the administrator and the guest. For instance, the role definition may specify that the administrator may read and write a "name" attribute and may call a "delete" method of the item, but the guest may only read the "name" attribute and is prevented from writing to the "name" attribute and from calling the "delete" method. Thus item access may be specified on an individual item basis and even for different methods and attributes for the item itself, further discussion of which may be found in relation to FIGS. 8-10. In the following discussion, an exemplary environment is first described which is operable to employ the storage system. Exemplary procedures are then described which may be implemented in the exemplary environment, as well as in other environments.

Exemplary Environment

Figure 1:
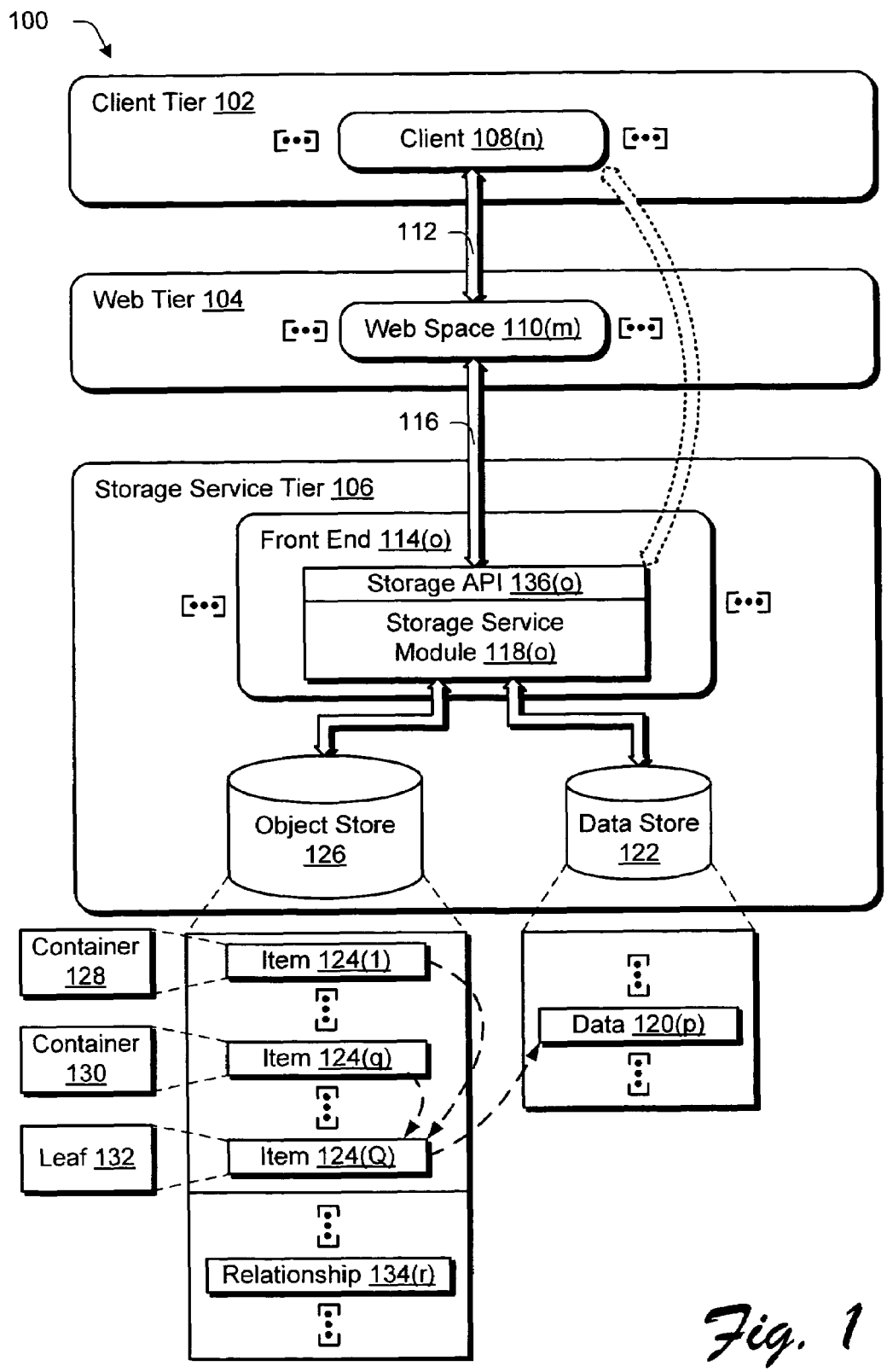
FIG. 1 is an illustration of an environment in an exemplary implementation that is operable to employ a storage application programming interface.

FIG. 1 is an illustration of an environment 100 in an exemplary implementation that is operable to employ a storage application programming interface. The illustrated environment 100 includes a client tier 102, a web tier 104, and a storage service tier 106. The client tier 102 includes a plurality of clients 108(n), where "n" can be any integer from one to "N". The clients 108(n) may be configured in a variety of ways. For example, one or more of the clients 108(n) may be configured as a computing device, such as a desktop computer, a mobile station, an entertainment appliance, a set-top box communicatively coupled to a display device, a wireless phone, a game console, and so forth. Thus, the clients 108(n) may range from full resource devices with substantial memory and processor resources (e.g., personal computers, game consoles) to low-resource devices with limited memory and/or processing resources (e.g., traditional set-top boxes, hand-held game consoles). The clients 108(n) may also relate to a person and/or entity that operate the clients. In other words, one or more of the clients 108(n) may describe logical clients that include users, software, and/or devices.

The clients 108(n) are communicatively coupled to a plurality of web spaces 110(m), where "m" can be any integer from one to "M", over a network 112. The network 112 may assume a wide variety of configurations. For example, the network 112 may include an Internet, a wide area network (WAN), a local area network (LAN), a wireless network, a public telephone network, an intranet, and so on. Further, although a single network 112 is shown, the network 112 may be configured to include multiple networks.

The plurality of web spaces 110(m) are representative of a plurality of web sites that the client 108(n) may access from over the network 112. For example, one or more of the web spaces 110(m) may be a news web site which provides news web pages, a photo-viewing site, a music download site, an email provider, an instant messaging service, and so on. Data provided by the web space 110(m) to the client 108(n) is obtained from the storage service tier 106.

The storage service tier 106 is illustrated as having a plurality of front ends 114(o), where "o" can be any integer from one to "O", which are accessible to the web space 110(m) via a network 116. The network 116 may be the same as or different from the network 112 which is used to communicatively couple the client tier 102 with the web tier 104. The storage service tier 106 may also be accessed directly by the client 108(n) without interacting with the web tier 104, which is illustrated in FIG. 1 by a curved and dashed arrow from the client 108(n) to the storage service tier 106. The front end 114(o) includes a storage service module 118(o) which is executable to manage a plurality of data 120(p), where "p" can be any integer from one to "P", which is stored in a data store 122. The data 120(p) may be configured in a variety of ways, such as web pages, photos, songs, email, documents, files, and so on.

The storage service module 118(o) is executable to manage the data 120(p) through use of a plurality of items 124(1), . . ., 124(q), . . ., 124(Q) which are illustrated as stored in an object store 126. The items 124(1)-124(Q) are representative of fundamental objects having properties which may be utilized to manage the data 120(p). For example, items 124(1), 124(q) may each be configured as a "container" 128, 130 which both include a particular item of data. A container is an object that can include other objects, such as folders, lists, and so on. Item 124(Q) is illustrated as a leaf 132 which may be contained with the containers 128, 130. Item 124(Q), in this instance, references a particular item of data 120(p), which is illustrated in FIG. 1 through use of a dashed line from item 124(Q) to data 120(p).

The plurality of items 124(1)-124(Q) in the illustrated implementation references the data 120(p) such that a particular item of data can be shared by two or more items. This is illustrated in FIG. 1 through dashed arrows which point from item 124(1) to item, 124(Q) and from item 124(q) to item 124(Q). Thus, a single instance of the data 120(p) referenced by item 124(Q) may be shared, such as included in both a web page and a web log. The object store 126 may also include data. For example, the object store 126 may include data pertaining to the referenced data 120(p), such as list entry data which describes a plurality of the data 120(p), may contain metadata describing referenced data 120(p), and so on further discussion of which may be found in relation to FIG. 3.

The object store 126 is also illustrated as including a plurality of relationships 134(r), where "r" can be any integer from one to "R". Relationships 134(r) are data structures which are used to indicate relationships between the plurality of items 124(1)-124(Q). For example, one of the relationships 134(r) may indicate that leaf 132 is to be included in container 128 and another one of the relationships 134(r) may indicate that leaf 132 is also included in container 130. Thus, the relationships 134(r) may be defined between the items 124(1)-124(Q) to produce hierarchies, which may give applications an intuitive technique to store and retrieve data 120(p) referenced by the items 124(1)-124(Q). The relationships 134(r) may also include other properties which aid the storage service module 118(o) in managing the data 120(p), further discussion of which may be found in relation to FIG. 2.

The storage service module 118(o) is illustrated as providing a storage API 136(o) which exposes the plurality of items 124(1)-24(Q) and relationships 134(r) for programmatic access over the network 116. For example, the web space 110(m) may call methods supported by the items 124(1)-124(Q) to interact with the data 120(p) to supply the data 120(p) to the client 108(n). In another example, the client 108(n) may interact directly with the storage API 136(*o*), which is illustrated in FIG. 1 through use of a double-headed dashed arrow between the client 108(*n*) and the storage API 136(*o*). For instance, the client 108(*n*) may be configured as a instant messaging module that, when executed, communicates directly with the storage API 136(*o*). A variety of other instances are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the storage techniques described below are platform-independent, meaning that the techniques may be implemented on a variety of commercial computing platforms having a variety of processors.

Figure 2:
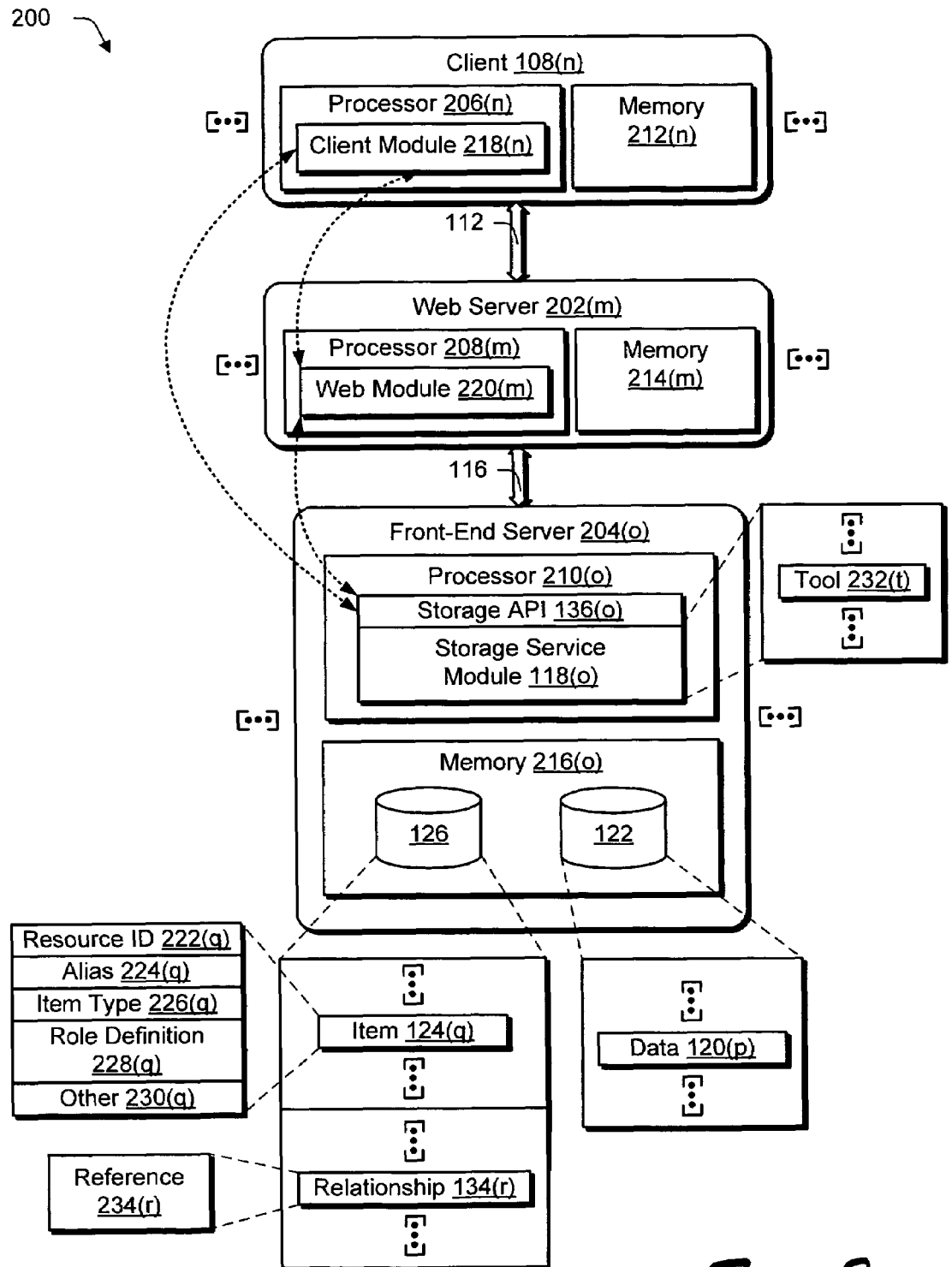
FIG. 2 is an illustration of a system in an exemplary implementation showing the environment of FIG. 1 as implemented by a plurality of computing devices.

FIG. 2 is an illustration of a system 200 in an exemplary implementation showing the environment 100 of FIG. 1 as implemented by a plurality of computing devices. The plurality of clients 108(*n*) are illustrated as client devices, the plurality of web spaces 110(*m*) of FIG. 1 are illustrated as provided by a plurality of web servers 202(*m*), and the plurality of front ends 114(*o*) of FIG. 1 are illustrated as provided by a plurality of front-end servers 204(*o*). Accordingly, the clients 108(*n*), web servers 202(*m*) and front-end servers 204(*o*) are each illustrated as including a respective processor 206(*n*), 208(*m*), 210(*o*) and a respective memory 212(*n*), 214(*m*), 216(*o*).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 212(*n*), 214(*m*), 216(*o*) is shown, respectively, for the clients 108(*n*), web servers 202(*m*) and front-end servers 204(*o*), a wide variety of types and combinations of memory may be employed, such as random access memory (RAM), hard disk memory, removable medium memory, and so forth.

The client 108(*n*) is illustrated as executing a client module 218(*n*) on the processor 206(*n*), which is also storable in memory 212(*n*). The client module 218(*n*) is executable to interact with the web server 202(*m*) over the network 112, which is illustrated by a dashed line from the client module 218(*n*) to the web server 202(*m*). The client module 218(*n*) is also executable to interact directly with the storage API 136(*o*) of the storage service module 118(*o*), which is illustrated by a dashed line from the client module 218(*n*) to the storage API 136(*o*).

The web server 202(*m*) is illustrated as executing a web space module 220(*m*) (hereinafter "web module") on the processor 208(*m*), which is also storable in memory 214(*m*). The web module 220(*m*) is executable to receive requests from the client module 218(*n*) for data 120(*p*) and retrieve the data 120(*p*) via the storage API 136(*o*). For example, the client module 218(*n*) may request a web page from the web module 220(*m*). The web module 220(*m*) may then be executed to obtain the web page from the plurality of data 120(*p*) via the storage API 136(*o*) and communicate the obtained web page back to the client 108(*n*). Thus, in this example the client 108(*n*) is not "aware" that the web page was obtained via the storage API 136(*o*).

The plurality of items 124(*q*) is illustrated as having a plurality of properties that may be utilized to manage the plurality of data 120(*p*) by the storage service module 118(*o*). Item 124(*q*), for example, is illustrated as having a resource ID 222(*q*), an alias 224(*q*), an item type 226(*q*), role definition 228(*q*), and other 230(*q*) properties.

The storage service module 118(*o*) provides access to the items 124(*q*) via two naming schemes, a resource ID 222(*q*) and an alias 224(*q*). The resource ID 222(*q*) may be configured as an encrypted string that represents an internal storage ID for the item 124(*q*). The alias 224(*q*) is a name created by a unique naming service of the storage service module 118(*o*) for the item 124(*q*). In an implementation, rather than creating two sets of APIs for manipulating items 124(*q*) in the object store 126, the storage API 136(*o*) will accept an argument known as an "object handle". An object handle is a data structure that can contain either the resource ID 222(*q*) or the alias 224(*q*). In an implementation, if both are present, the storage service module 118(*o*) will return an error.

The resource ID 222(*q*) and/or the alias 224(*q*) may be utilized in a variety of ways. The storage API 136(*o*), for instance, will return the resource ID 222(*q*) in response to a "create" call to the storage API 136(*o*). The object handle may also support an optional field referred to as "relationship name". The relationship name contains a name of the relationship to an item that is a child of the object (e.g., item or relationship) referenced by the alias 224(*q*) or the resource ID 222(*q*). Thus, the relationship name field may be utilized to indicate how a particular item of data 120(*p*) is being accessed. This may be utilized to determine different permissions that may be utilized to provide access, further discussion of which may be found beginning in relation to FIG. 6.

The item type 226(*q*) identifies the "type" of the item 124(*q*). For example, as previously described the item 124(*q*) may be configured as a container or a leaf. The item 124(*q*) may also be configured in a variety of other ways which are configured to address a particular type of data 120(*p*) being stored. For example, the item type 226(*q*) may be configured to address particular properties for a photo and therefore include attributes and methods configured to address the properties of a photo. Additional types may also be specified, such as songs, documents, and so on.

Further, the storage service module 118(*o*) may provide a plurality of tools 232(*t*), where "t" can be any integer from one to "T", for creation of different types of items by a user. For example, the tools 232(*t*) may be executed to provide a user interface (UI) for generating a new storage object schema and code used to access those objects based on an XML definition. Thus, the plurality of tools 232(*t*) may be utilized by a user to create a reusable type of item 124(*q*) for particular types of data 120(*p*), further discussion of which may be found in relation to FIG. 14.

The role definition 228(*q*) specifies conditional access rights for particular "roles" in relation to the item 124(*q*). For example, the item 124(*q*) may provide access to a first set of methods and attributes to a first role which are different than access provided to another role, such as "administrator" and "guest". Thus, the role definition 228(*q*) may be utilized to restrict item 124(*q*) access with different levels of granularity, such as to the item 124(*q*) itself, as well as to different attributes and methods of the item 124(*q*). Further discussion of role definition 228(*q*) may be found beginning in relation to FIG. 6. The item 124(*q*) may also support a wide variety of other 230(*q*) properties.

The relationship 134(*r*) may also support a variety of properties. For example, the relationship 134(*r*), as previously described, is a data structure which is used to indicate how the plurality of items 124(*q*) are related, one to another. Therefore, a particular relationship 134(*r*) may include a references 234(*r*) which reference particular items 124(*q*), to which, the relationship 134(*r*) pertains. For instance, the relationship 134(*r*) may indicate that a first one of the plurality of items 124(*q*) is a child of another one of the plurality of items 124(*q*). Relationships 134(*r*) may also serve a variety of other purposes, such as defining a containment hierarchy, specify lifetime control, define permissions, serve as a pointer to an item via a "parent item+relationship", include relationship metadata such as a sequence number to enable ordering of photos within a folder using the sequence number, and so on. Thus, the plurality of relationships 134(*r*) may provide a flexible technique to produce hierarchies that enable the items 124(*q*) to reflect intuitive ways to store and retrieve data 120(*p*), further discussion of which may be found in relation to the following figure.

Figure 3:
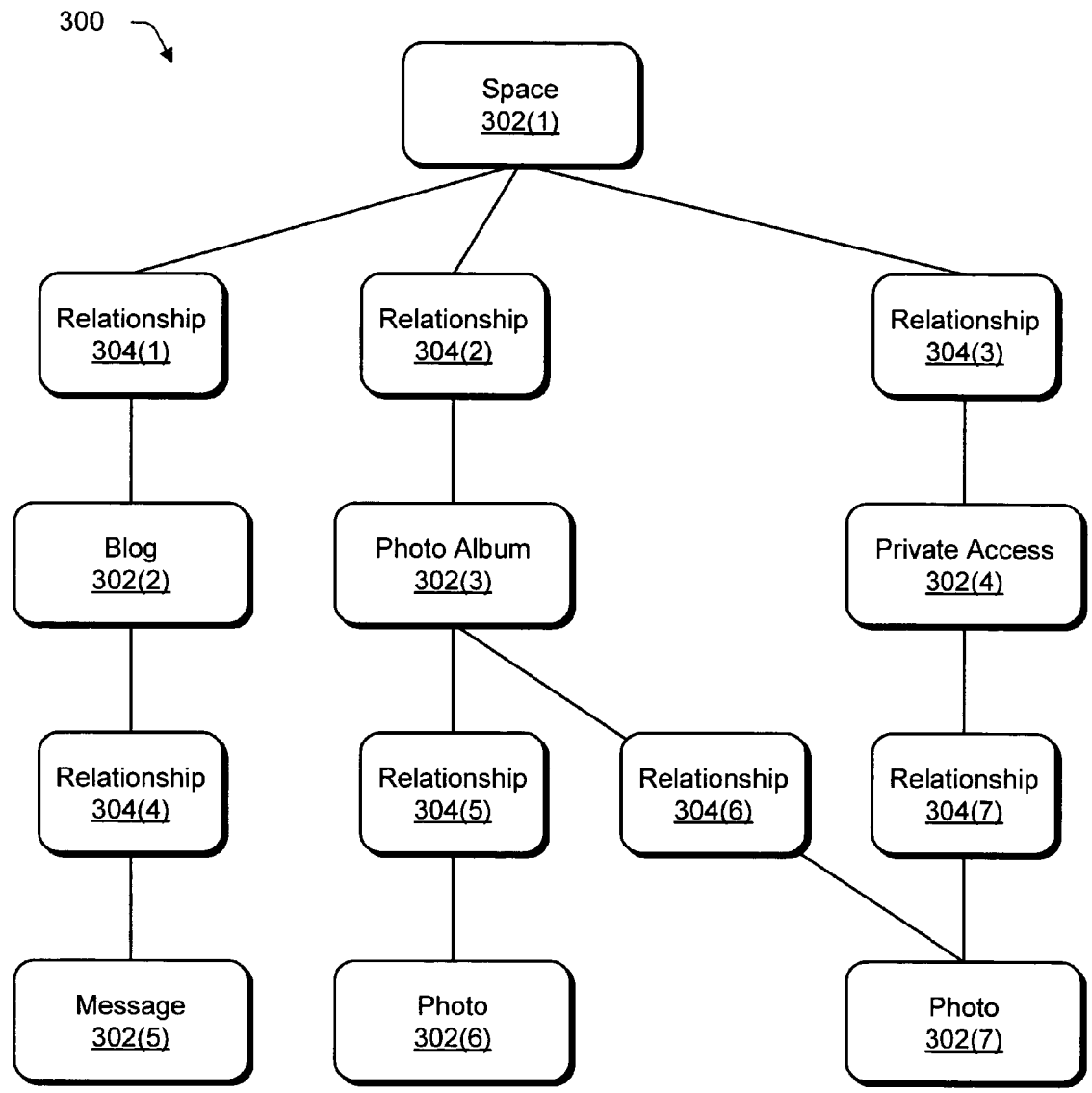
FIG. 3 is an illustration of an exemplary implementation showing a hierarchy configured from a plurality of items and a plurality of relationships.

FIG. 3 is an illustration of an exemplary implementation showing a hierarchy 300 configured from a plurality of items 302(1)-302(7) and a plurality of relationships 304(1)-304(7). The plurality of items 302(1)-302(7) in this instance correspond to a usage space of a particular owner, e.g., web space 110(*m*) of FIG. 1. Therefore, a space 302(1) is shown as a parent item which corresponds to the particular owner.

There may be instances, for example, when the space 302(1) item is referenced via an owner's unique identifier. This may be accomplished by referencing the space 302(1) item in the following manner. An application (e.g., client 108(*n*)) calling the storage API 136(*o*) may specify the unique identifier of the owner of a namespace in the alias field (e.g., alias 224(*q*) of FIG. 2) of the object handle class of the space item 302(1). In addition, the alias namespace field may contain a string (e.g., "MyStuff") and a relationship name of the object handle class may contain a literal string, e.g., "MySpace". The resource ID (e.g., resource ID 222(*q*) of FIG. 2) for the object handle may be set to NULL. An example of such code which complies with these examples is shown as follows:

```
ObjectHandle        spaceHandle;
// The Alias.Name below is the unique identifier for the owner
spaceHandle.Alias.Name = "039184404780474098409";
spaceHandle.Alias.Namespace = "MyStuff";
spaceHandle.RelationshipName = "MySpace";
spaceHandle.ResourceID = NULL;
spaceID = GetSpace(spaceHandle, Layout | Style | Theme | Relationships | LCID);
//On return the SpaceHandle Alias structure will be filled in
aliasInfo.AliasName = spaceHandle.Alias.Name;
aliasInfo.AliasNamespace = spaceHandle.Alias.NameSpace;
```

In the above example, an application executing the code will have retrieved the space 302(1) object without knowing the object alias, e.g., alias 224(*q*) of FIG. 2.

As shown in the hierarchy 300 of FIG. 3, the relationships 304(1)-304(7) may be defined between the items 302(1)-302(7) to produce the hierarchy 300. Additionally, multiple relationships 304(6)-304(7) may be defined to share an item 302(7). For example, a photo album 302(3) and a private access 302(4) folder may each have respective relationships 304(6), 304(7) which involve a photo 302(7). Therefore, a single instance of the photo 302(7) may be utilized in different implementations, thereby conserving memory space utilized by the hierarchy 300. Additionally, the different relationships 304(6), 304(7) may specify different properties for accessing the photo 302(7). For example, relationship 304(6) may specify a name (e.g., "California Vacation") for the photo 302(7) which is different than a name 304(7) (e.g., "Spring Break") utilized by the relationship 304(7). A variety of other instances are also contemplated.

The hierarchy 300 may also support dynamic object manipulation such that changes may be made to an order and structure of the hierarchy 300 through adding/removing items and/or relationships. For example, a "delete item" operation may be performed in order to delete the photo album 302(3) item. Therefore, the storage service module 118(*o*) deletes any "child" items (e.g., photo 302(6)) that are referenced solely by the photo album 302(3) as well as any relationships which involve the photo album 302(3), a result of which is shown in the following figure.

Figure 4:
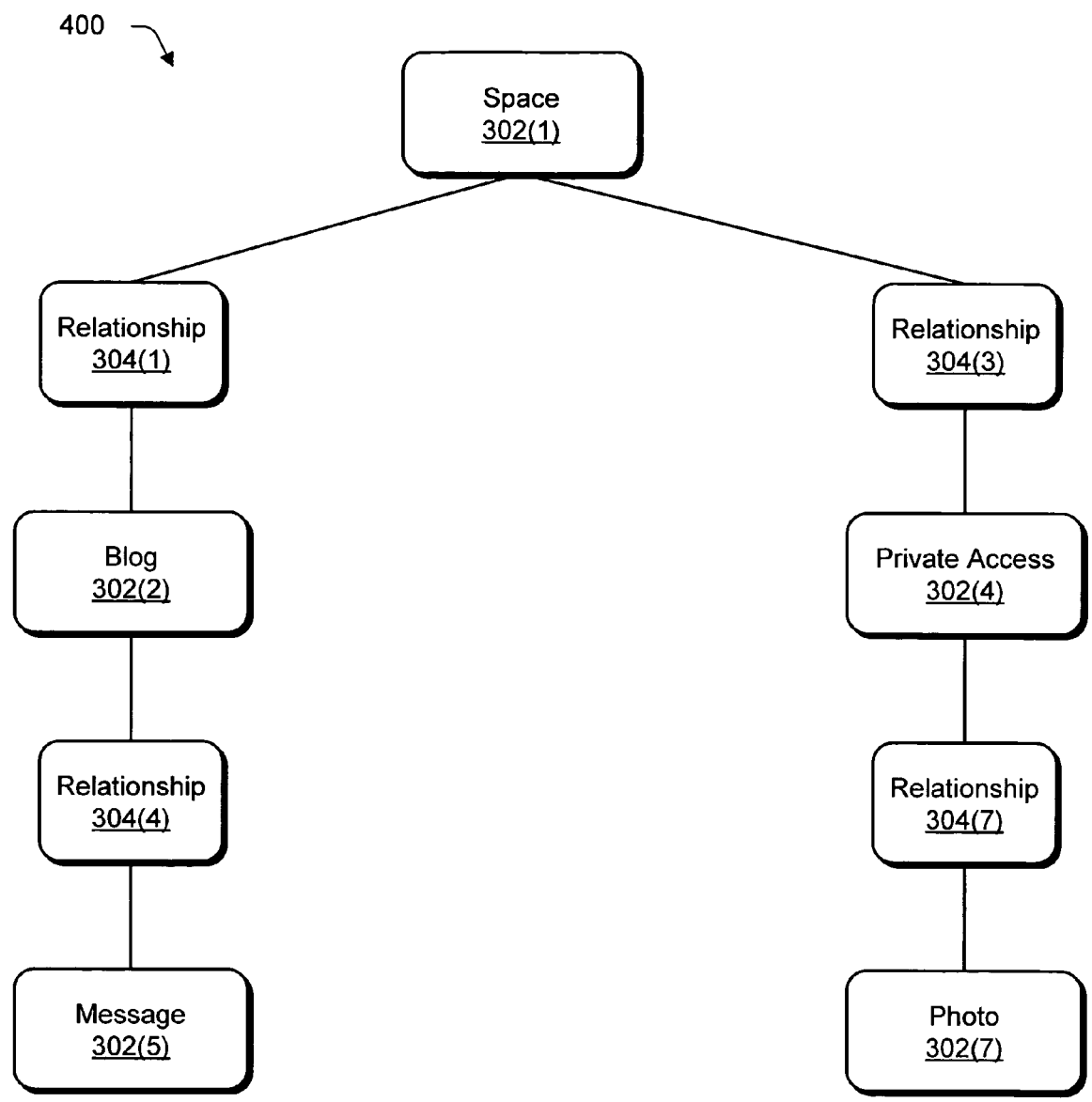
FIG. 4 is an illustration of a hierarchy formed from the hierarchy of FIG. 3 by a "delete item" operation.

FIG. 4 is an illustration of a hierarchy 400 formed from the hierarchy 300 of FIG. 3 by a "delete item" operation. In the hierarchy 400 of FIG. 4, the photo album 302(3) and the photo 302(6) have been deleted. Additionally, any relationships 304(2), 304(5), 304(6) which reference the photo album 302(3) are also deleted. It should be noted that in the hierarchy 400 of FIG. 4, the photo 302(7) is not deleted because it still has an active relationship with private access 302(4) item.

Returning again to FIG. 3, a "delete relationship" operation may also be performed to delete a relationship between items. For example, a first delete relationship operation received via the storage API 136(*o*) may specify that relationship 304(4) is to be deleted between the blog 302(2) item and a message 302(5). A second delete relationship operation received via the storage API 136(*o*) may specify that relationship 304(6) is to be deleted between the photo album 302(3) and the photo 302(7). A result of these operations is shown in FIG. 5.

Figure 5:
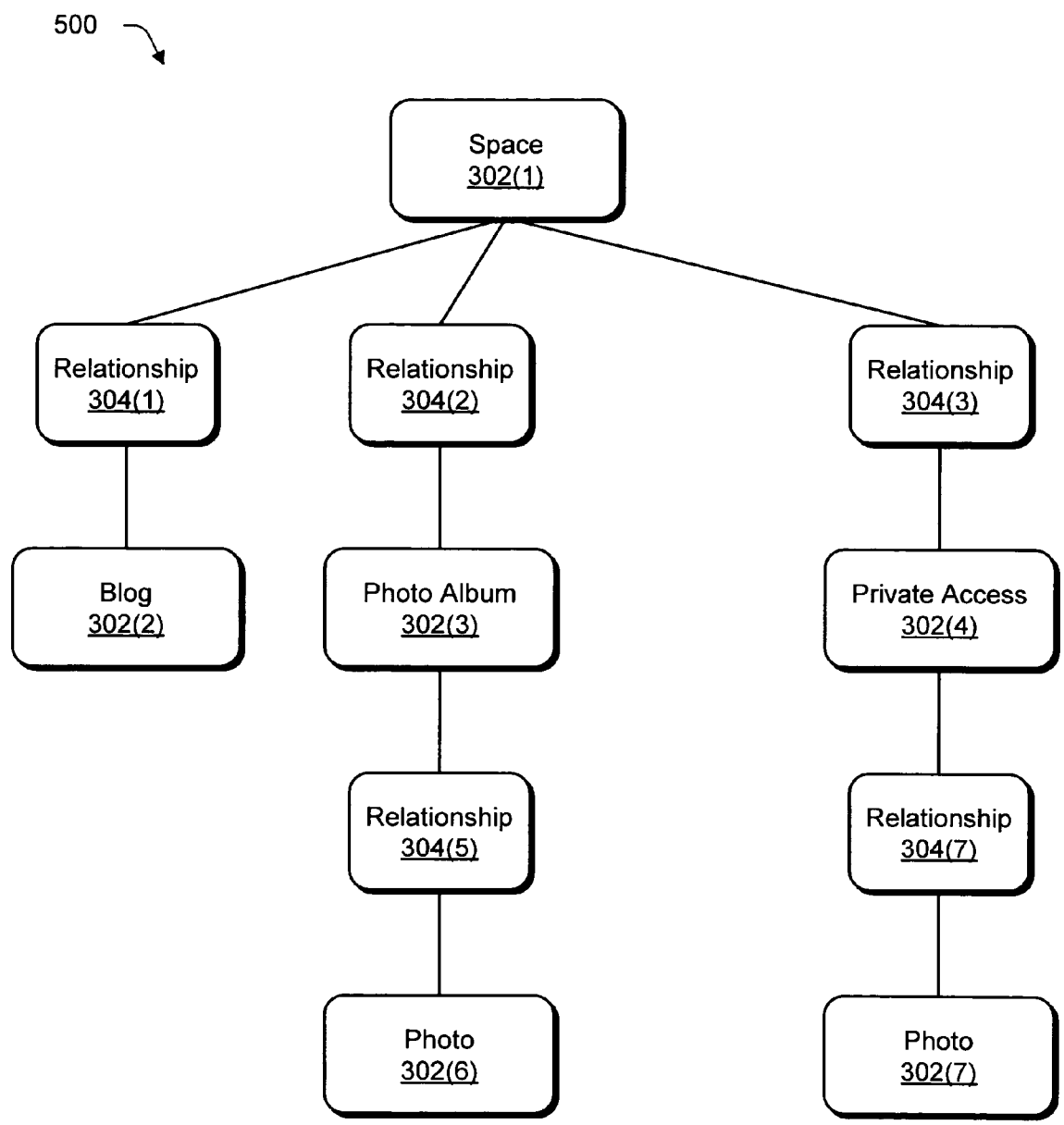
FIG. 5 is an illustration of a hierarchy formed from the hierarchy of FIG. 3 h a plurality of "delete relationship" operations.

FIG. 5 is an illustration of a hierarchy 500 formed from the hierarchy 300 of FIG. 3 through a plurality of "delete relationship" operations. The first delete relationship operation specified that relationship 304(4) is to be deleted between the block 302(2) and the message 302(5). As a result of the deletion, the message 302(5) is not associated (i.e., related) with another item, and is therefore deleted from the hierarchy 300 to form hierarchy 500.

The second delete relationship operation specified that relationship 304(6) is to be deleted from between the photo album 302(3) and the photo 302(7). Therefore, because of the deleted relationship 304(6), the photo album 302(3) no longer includes the photo 302(7). However, the photo 302(7) is not deleted because a relationship 304(7) still exists between the photo 302(7) and the private access 302(4) folder. A variety of other instances are also contemplated. For instance, similar techniques may be utilized to create new relationships between items, create new items, and so on. Thus, the storage service module 118(*o*) through the storage API 136(*o*) may enforce manipulation of the items and relationships to form a hierarchy that may share and reuse data.

Figure 6:
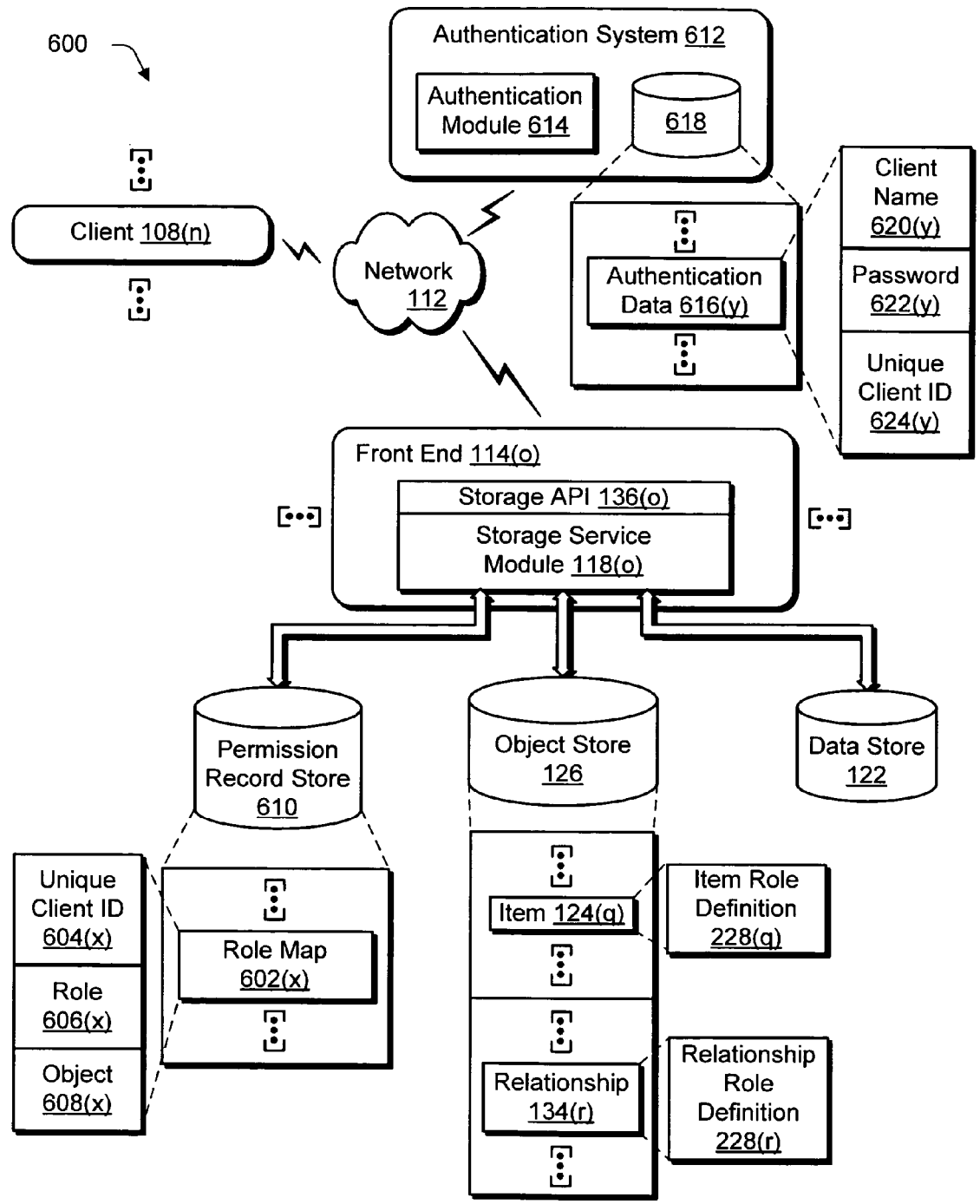
FIG. 6 is an illustration of an environment in an exemplary implementation in which permission-based access is employed to limit access to items, as well as particular methods and attributes of the items.

FIG. 6 is an illustration of an environment 600 in an exemplary implementation in which permission-based access is employed to limit access to items, as well as particular methods and attributes of the items. As previously described, each item 124(*q*) may include an item role definition 228(*g*) which specifies which roles may perform which actions with respect to the item 124(*q*). Likewise, a relationship role definition 228(*r*) may specify which roles may perform which actions with respect to a relationship 134(*r*).

Role definitions may apply to a variety of distinct sets of operations, such as item attribute access (e.g., Read/Write), method access, and sub-item creation. For instance, attributes can also be specified to have separate access rights than other attributes for the same item 124(q), a role definition may be configured to restrict access to specific methods to specific roles, a role definition may be configured to restrict sub-item creation to certain roles, and so on.

To locate a particular role that is to be utilized for a particular one of the plurality of clients 108(n), a plurality of role maps 602(x) may be utilized, where "x" can be any integer from one to "X". A role map 602(x), for instance, may be formed as a combination of an identity or group of identities (e.g., unique client ID 604(x)), roles 606(x) associated with that identity, and the object 608(x), to which, the roles apply, such as the item 124(q) and/or the relationship 134(r). The role definition specifies a particular role (e.g., item role definition 228(g), relationship role definition 228(r)) and access rights of that role. For example, an administrator may have conditional access rights to perform certain operations on the item 124(q) that are not granted to a guest.

Although the role maps 602(x) are illustrated as stored in a permission record store 610 (e.g., such as an address book clearinghouse), one or more role maps may be assigned by the storage service module 118(o). For example, the storage service module 118(o) may assign owner and creator roles for a particular item 124(q) and/or relationship 134(r). For instance, the owner of a component may be one of the clients 108(n) who is responsible for a particular portion of the data store 122, such as the purchase of online storage for providing a web page. Thus, the owner has ultimate lifetime control of an object in the space. A creator is a client who created the object, such as the item 124(q) or the relationship 134(r). Thus, the creator is not necessarily the owner since a client may contribute to an item that is owned by another client. For example, a first client may own a blog but another client may post a comment to the blog, which would then be a creator of the comment but is not an owner of the blog.

The storage service module 118(o) may also enforce multiple roles for a client 108(n). For example, the client 108(n) may be both an owner and a creator of the item 124(q). In such an instance, the storage service module 118(o) may utilize the role that will grant the most privileges, i.e., access to additional methods and/or attributes. In another implementation, the storage service module 118(o) may utilize the role that will grant the least amount of privileges. In a further implementation, the storage service module 118(o) "ORs" the privileges granted by the different roles. A variety of other implementations are also contemplated.

Roles may be assigned to clients 108(n) in a variety of ways. For example, the environment 600 is illustrated as including an authentication system 612. The authentication system 612 includes an authentication module 614 which is executable to verify that the clients 108(n) "are who they say they are" by utilizing a plurality of authentication data 616(y), where "y" can be any integer from one to "Y", which is stored in a database 618. For instance, the client 108(n) may supply a client name and password. The authentication module 614 may then verify the client using a stored client name 620(y) and password 622(y) from the authentication data 616(y). If valid, a unique client ID 624(y) is provided for identifying the client 108(n) by the storage service module 118(o). For instance, the unique client ID 624(y) may be compared with the unique client ID 604(x) of the role map 602(x) to determine which role 606(x) is applicable to the client 108(n) for accessing a particular object 608(x). This role 606(x) may therefore be utilized by the item role definition 228(g) and/or the relationship role definition 228(r) to determine which methods and attributes may be accessed (e.g., read or written) by the client 108(n). Thus, the authentication system 612 may verify the clients 108(n) identity, the permission record store 610 may be utilized to determine which role 606(x) is applicable to the client 108(n), and the role may be utilized in conjunction with role definitions (e.g., item role definition 228(g) and/or relationship role definition 228(r)) to permit or deny access to methods and attributes by the storage service module 118(o).

Figure 7:
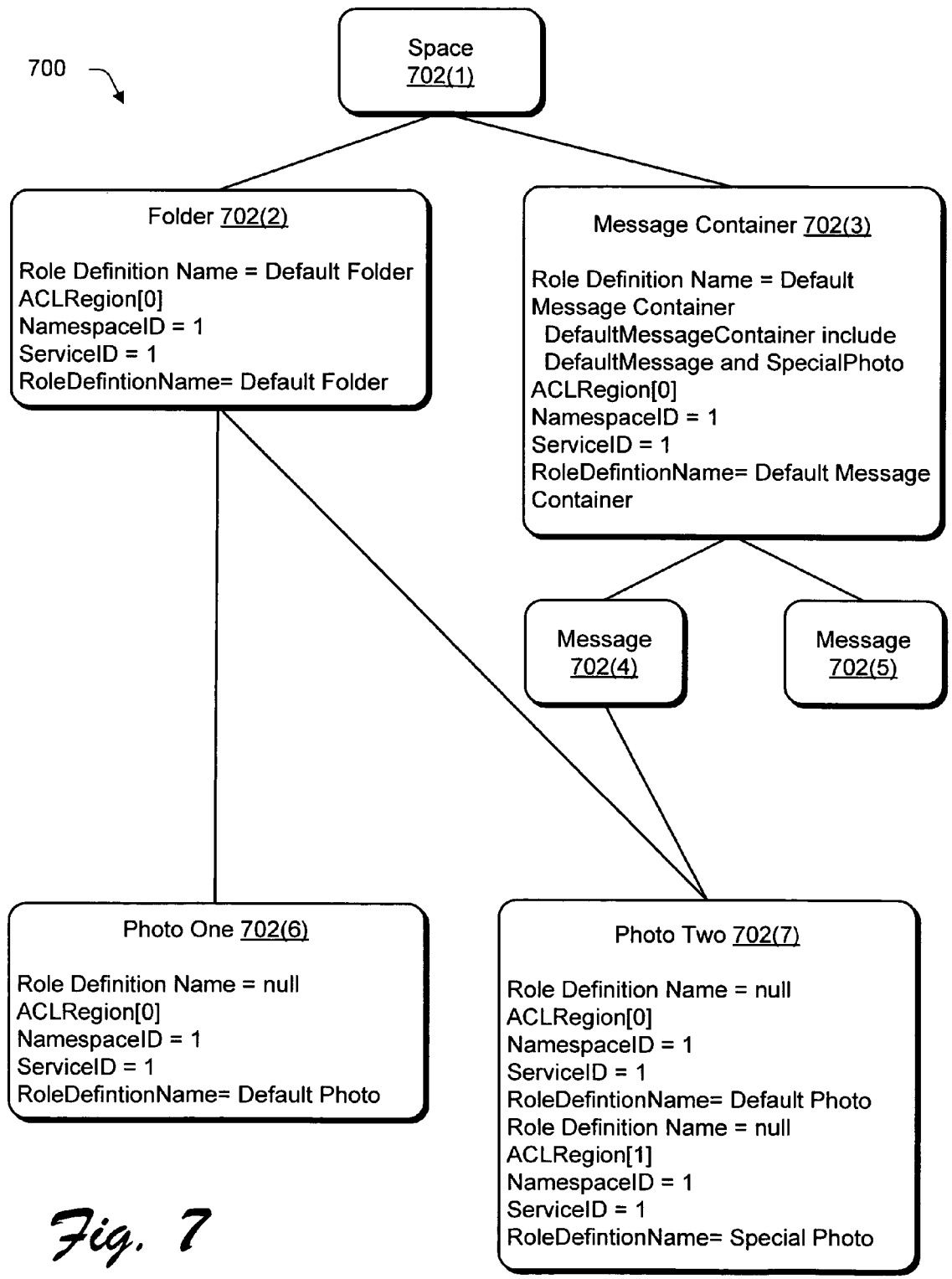
FIG. 7 is an illustration of a hierarchy in an exemplary implementation in role assignment and inheritance are shown.

FIG. 7 is an illustration of a hierarchy 700 in an exemplary implementation in which role assignment and inheritance are shown. When a container object is created (e.g., folder 702(2), message container 702(3)), the container's role definition may include information about the role definition for each of the items that it contains, e.g., leaf items. For instance, role definitions may be set on container items at creation time by specifying a name of the role definition in a "role definition name" field of an item's role definition attribute. Thus, the container's role definition may include the role definitions for all of the possible children of the container as well.

In an implementation, role definitions are assigned to leaf items by their parent containers when the leaf item is created. A reference to the role definition inherited from the parent item is stored in a record in the item's "ACLRegion" class along with the applicable namespace ID and service ID, which are used to obtain an applicable one of the plurality of role maps 602(x). The following operations may affect the ACLRegion class contents:

Create relationships—where an affected item is a target of a new relationship;

Share item—where an affected item is a child of the item shared; and

Updating the parent's Compont role definition—this may cause the affected item to inherit a new role definition.

Updating individual Item's Instance Role Definition

In FIG. 7, although the ACLRegion is illustrated in the items (e.g., 702(1)-702(7)) for clarity of the figure, the ACLRegion may be defined separately in the "relationship" nodes as previously illustrated in FIGS. 3, 4 and 5. Thus, when an item has two or more parent relationships, the item may inherit the ACLRegion from both parents, which is then utilized to determine access rights to the item.

The hierarchy 700 of FIG. 7 shows an exemplary affiliation of role definitions of a plurality of items 702(1)-702(7). The hierarchy 700 is configured such that items may inherit role definitions from each other. For example, a "photo two" 702(7) item has inherited role definitions from both the folder 702(2) item and the message container 702(3) item. The role definition for photo two 702(7) is defined in the message container 702(3) item role definition, and not in the message 702(5) item. The role definition name for photo one 702(6) item and photo two 702(7) item is null. For example, leaf items may be configured such that a role definition name is assigned only if the leaf item had a particular role definition assigned. In another implementation, multiple service IDs are associated with a single item, for example, if the message container 702(3) is by another service in the permission record store 610 of FIG. 6.

Exemplary Procedures

The following discussion describes storage techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the shown for performing the operations by the respective blocks. In portions following discussion, reference will also be made to FIGS. 1-7.

Figure 8:
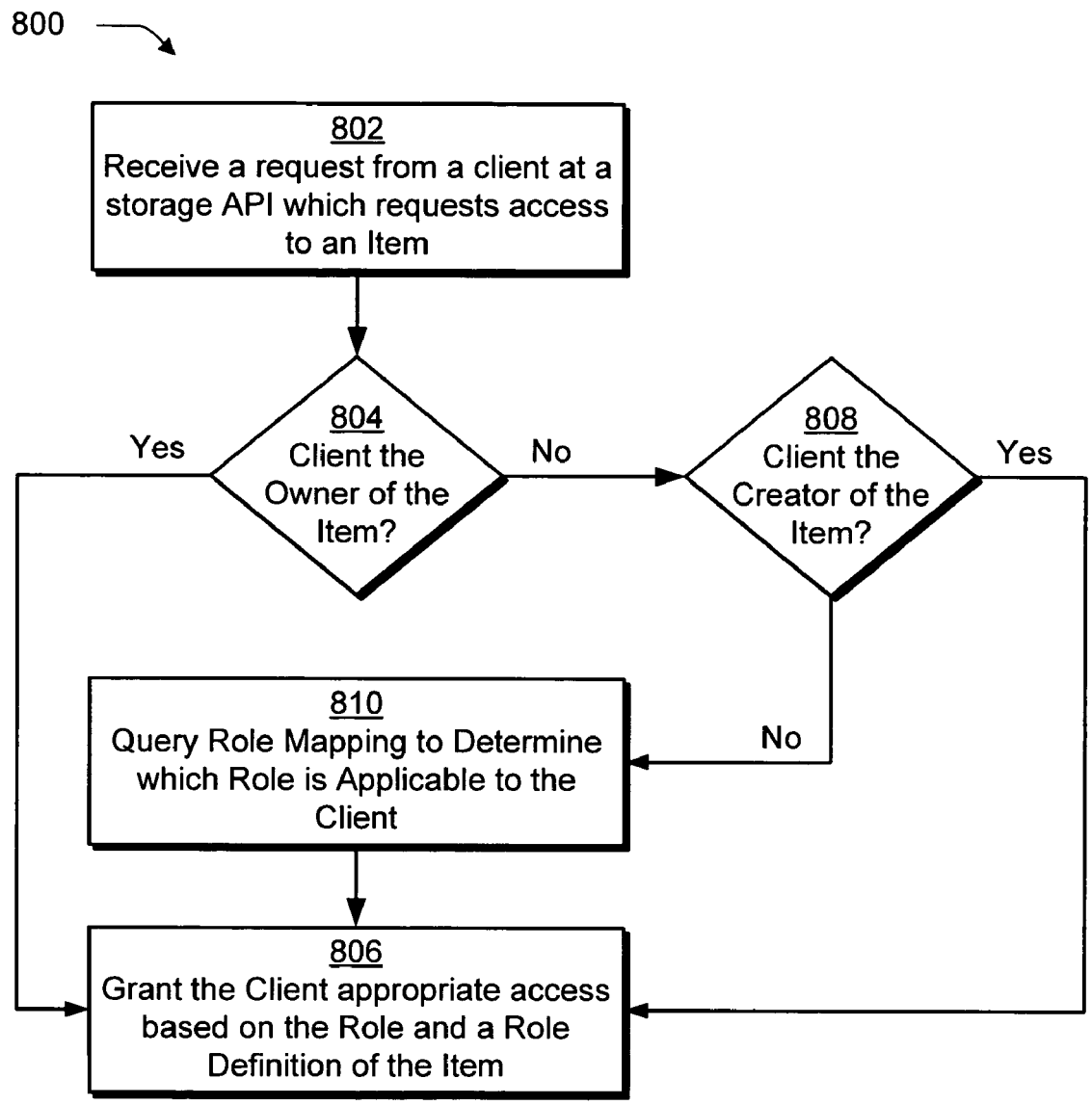
FIG. 8 is a flow diagram depicting a procedure in an exemplary implementation in which a request received at a storage application programming interface (API) is processed to determine what access rights, if any, a sender of the request has to an item referenced by the request.

FIG. 8 is a flow diagram depicting a procedure 800 in an exemplary implementation in which a request received at a storage API is processed to determine what access rights, if any, a sender of the request has to an item referenced by the request. A request is received from a client over a network at a storage API which requests access to a item (e.g., data 120(p)) (block 802). In response to the request, the storage service module may be executed to use the following logic to determine if the user has access to the item.

The storage service module determines if the client is the owner of the item on block 804). For example, the storage service module may compare a client ID of the client with an owner unique client ID of the item. If a is found, the client is the owner of the item ("yes" from decision block 804) e client is granted appropriate access based on the role and a role definition of the item (block 806). For example, the role mapping may define which methods and/or attributes may be called, modified, read, written, and so on by the owner of the item.

If a match is not found, the client is not the owner of the item ("no" from decision block 804). A determination is made as to whether the client is the creator of the item (decision block 808). For example, the storage service module may compare a unique client ID of the client with a creator unique client ID of the item. If a match is found, the client is the creator of the item ("yes" from decision block 808) and the client is granted appropriate access based on the role and a role definition of the item (block 806). Like before, the role mapping may define which methods and/or attributes may be called, modified, read, written, and so on by the creator of the item.

If a match is not found, the client is not the creator of the item ("no" from decision block 808). Therefore, a role mapping is queried to determine which roles are applicable to the client (block 810) and the client is granted appropriate access based on the role and the role definition of the item (block 806). In this exemplary implementation, the storage service module 118(o) first determines whether the client complies with one of the roles which are defined by the storage service module 118(o), which is this instance are "creator" and "owner". If the client does not comply with a role defined by the storage service module 118(o), the storage service module 118(o) queries a role map 602(x) for the item 124(q) from a permission record store 610 which defines which role may be applicable to the client. A variety of other implementations are also contemplated. For example, a role map may specify each of the roles, a storage service module may specify each of the roles, and so on.

The two tables shown below provide examples of different roles and abbreviations of the respective roles as used in the following implementations. The first table portrays roles assigned by the permission record store 610 of FIG. 6. The second table portrays roles that may be assigned by the storage service module 118(o) itself.

TABLE 1

Permission Record Store Role Abbreviations

| Role | Symbol |
| --- | --- |
| Contributor | CT |

TABLE 2

Storage Service Module Role Abbreviations

| Role | Symbol |
| --- | --- |
| Owner | O |
| Creator | C |
| User | U |

The information in Table 2 also represents what the corresponding role definition class may contain for this item.

Access to items may be provided to use different behaviors based on a specific instance of an item. The definition of the behavior for these attributes is defined in an "instance-specific role definition". For example, instance-specific role definitions may be defined by specifying owner, creator or user roles for an item. "User" in this instance a shorthand way of specifying any permission record store 610 role that may have the specified permissions.

In an implementation, items are not required to have instance-specific role definitions. When an instance-specific role definitions is defined for an item, it may overlap with a component (e.g., item 124(q) or relationship 134(r)) defined role definition. In such a case, the permissions granted to the client may be based on "ANDing" the rights granted to the calling client. For instance, a "name" field of an item may have the following role definition and instance role definition:

TABLE 3

Item Name Role Definition

| Field Name | Read Access | Create Access | Write Access |
| --- | --- | --- | --- |
| Name | O, C, CT | C | O, C, CT |

TABLE 4

Item Name Instance Role Definition

| Field Name | Read Access | Create Access | Write Access |
| --- | --- | --- | --- |
| Name | O, C, U | C | O, C |

Resulting rights to the item may be represented as follows:

TABLE 5

Resulting Role Definition for the Item

| Field Name | Read Access | Create Access | Write Access |
| --- | --- | --- | --- |
| Name | O, C, CT | C | O, C |

Figure 9:
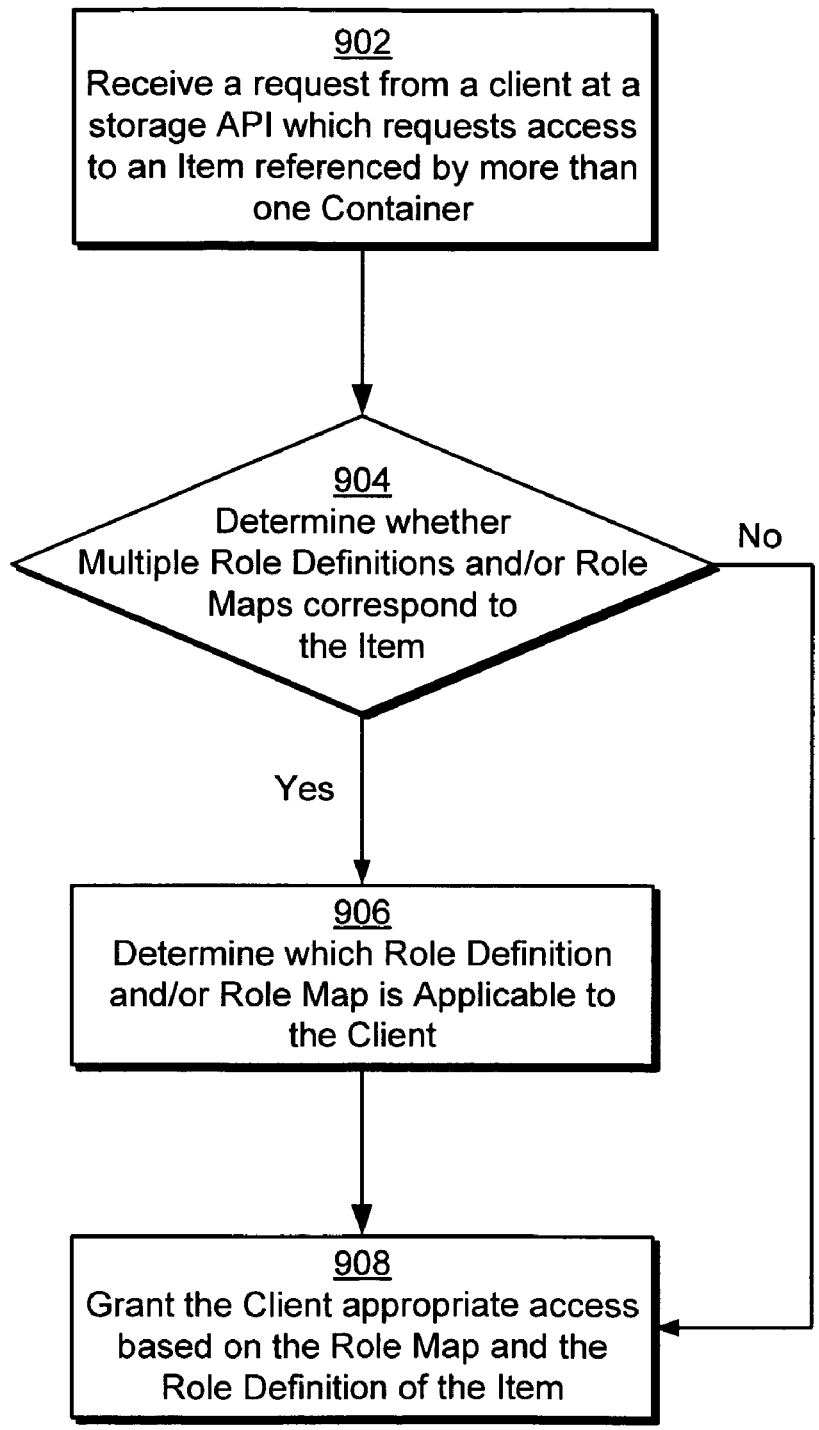
FIG. 9 is a flow diagram depicting a procedure in an exemplary implementation in which access control provided via a storage API to a multi-referenced item having a plurality of role definitions and role mappings is shown.

FIG. 9 is a flow diagram depicting a procedure 900 in an exemplary implementation in which access control provided via a storage API to a multi-referenced item having a plurality of role definitions and role mappings is shown. Clients may retrieve role definition information about an item when the item is retrieved. The role definition information returned, for instance, may represent a combination of a container defined and instance-specific role definitions. This may be utilized by the client in a variety of ways. For example, the client may determine what particular user interface (UI) to output for a particular user based on the rights specified by the role definition. This information can be requested by the client by specifying the role definition attribute when the item is retrieved.

As previously described, however, items may have multiple role mappings and multiple roles. For example, in a scenario in which an item is referenced by two containers, a possibility exists that the item may have two role maps and two role definitions associated with the item. In some instance, in order for the proper access to be granted, the correct role map applied should correspond with a particular role definition. Therefore, a determination is made as to which role and role mapping are applicable to a client that provided a request via the storage API.

A request is received, for instance, from a client at a storage API which requests access to an item referenced by more than one container (block 902). For instance, photo two 702(7) of FIG. 7 may be referenced by folder 702(2) and message container 702(3). Therefore, a determination is made as to whether multiple role definitions and/or roles apply to the client (decision block 904).

If multiple role definitions and/or role maps correspond to the item ("yes" from decision block 904), a determination is made as to which role definition and/or role map is applicable to the client (block 906) which originated the request. The storage service module 118(*o*), for instance, may ensure this behavior by storing a role map/role definition combination in an "ACLRegion" class of the item. Therefore, to determine access for an item that has multiple references, the storage service module 118(*o*) may examine the ACLRegion information inherited from each parent item and apply logic to each combination independently and then "or" the results. Thus, the storage service module 118(*o*) may determine access rights for an item that has multiple references, and grant the client appropriate access based on the role map and the role definition of the item (block 908).

Figure 10:
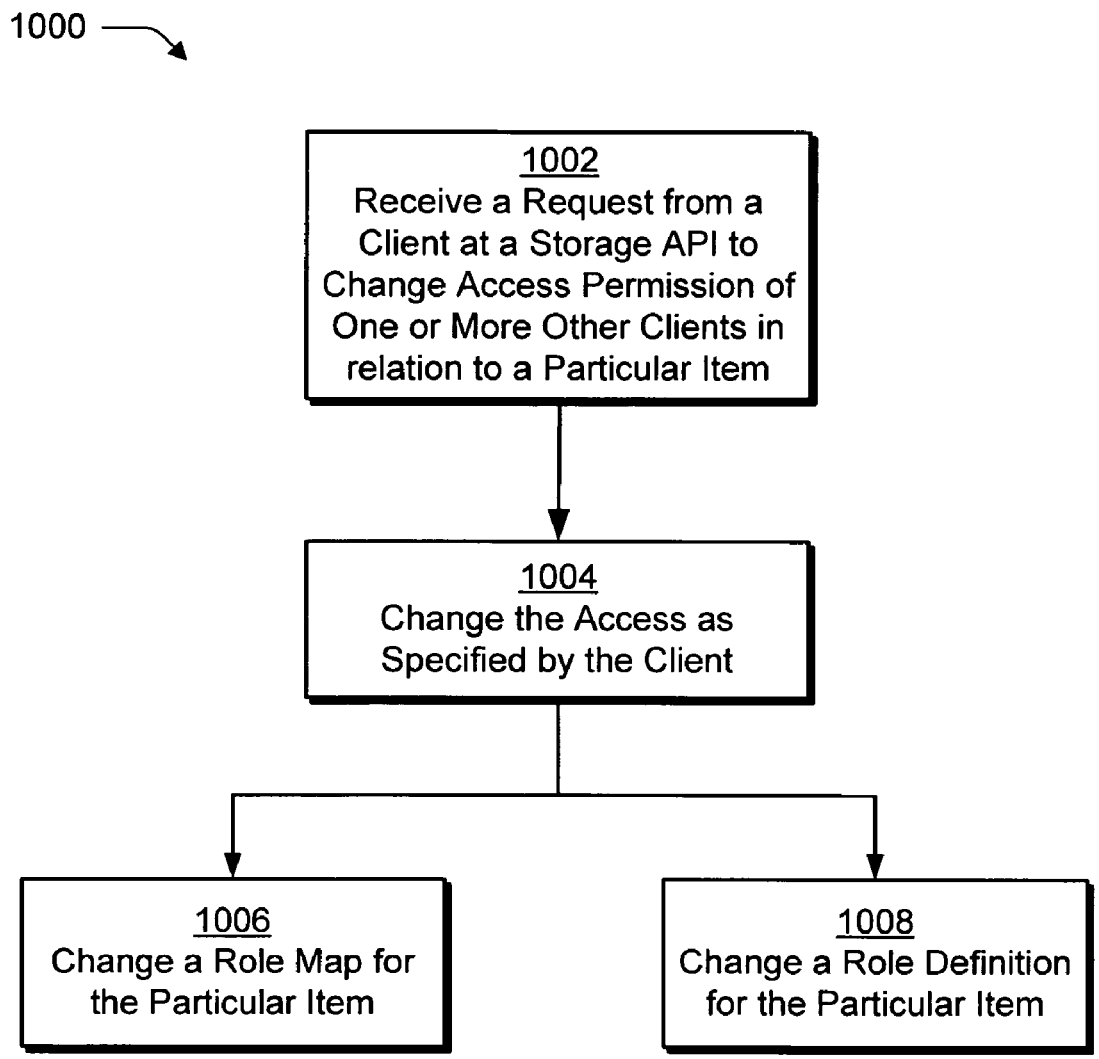
FIG. 10 is a flow diagram depicting a procedure in an exemplary implementation in which access permission is changed for an item.

FIG. 10 is a flow diagram depicting a procedure 1000 in an exemplary implementation in which access permission is changed for an item. A request is received from a client at a storage API to change access permission of one or more other clients in relation to a particular item (block 1002). For example, one of the plurality of clients 108(*n*) may wish to change how other ones of the plurality of clients 108(*n*) are permitted to access an item 124(*q*). The access is changed as specified by the client (block 1004), which may be performed in a variety of ways.

A role map, for instance, for the particular item may be changed (block 1006). In another instance, a role definition for an item may be changed (block 1008). For example, role map changes may be carried out via permission record store 610 APIs. Role definitions are defined in the objects (e.g., item 124(*q*) and/or logically as a part of the relationship 134(*r*)) themselves and may be modified via "update" methods. For example, "update" methods may be utilized to update any non-read-only attribute and may utilize a similar mechanism. An example of each is provided below.

For instance, a space, referred to as "Fred's Space" may include the following items:

PhotoAlbum, Blog, and Favorites List.

Additionally, Fred's Space may have the following role map:

Owner: Fred;
Admin: Sally; and
Guest: Justin, Juan, and Suzy.

Further, Fred's Space may have the following role definition which is assigned to each of the items in Fred's Space:

TABLE 6

Sample Default Role Definition

| | Roles | |
|---|---|---|
| Attribute | R | W |
| Name | O, A, M, CT, G | O, A |
| Type | O, A, M, CT, G | |
| Method | Roles | |
| Get* | O, A, M, CT, G | |
| Update* | O, A | |
| Delete* | O, A | |

The roles specified above include owner ("O"), administrator ("A"), member ("M"), contributor ("CT"), and guest ("G"). A variety of other roles may also be specified.

In the example above Fred and Sally are the only users who have permission to change the names of the item or call the respective "update" and "delete" methods. Each of the other clients is given permission to read the various attributes and call the respective "get" methods.

Access to Fred's Space may be modified in a variety of ways, such as by adding an additional client to either the "administrator" role or the "guest" role using an "AddRoleMembership" method of the permission record store 610. A new client, referred to as "Ted", may be added to the guest role giving that client guest privileges when interacting with the items in Fred's Space, which may be represented as follows:

Owner: Fred;
Admin: Sally; and
Guest: Justin, Juan, Suzy, and Ted.

Thus, Ted would now have the ability to read the "name" and "type" attributes as well as call the "get" method.

Access to the space may also be modified by making changes to the role definition (block 1008). For example, a client may determine which of the available role definitions is desired for application to the item and change it by updating a "RoleDefinitionName" attribute on the item's role definition attribute. The client may then call the "update" method for that item.

Continuing with the previous example, assume that Fred desires to restrict access to each of the items in Fred's Space such that Fred is the only client that can delete objects (e.g., items and/or relationships) from this Space. In this case, Fred may select a role definition for the particular methods which specifies that only the owner (i.e., Fred) may update and delete items in Fred's Space. For example, Fred may select a preexisting role definition titled "OwnerOnlyUpdater" that specifies the following roles:

TABLE 7

Exemplary "RoleDefinitionName" Attribute

| Attribute | R | W |
|---|---|---|
| Name | O, A, M, CT, G | O, A |
| Type | O, A, M, CT, G | |
| Method | Roles | |
| Get* | O, A, M, CT, G | |
| Update* | O | |
| Delete* | O | |

Thus, Fred may assign "RoleDefinition.RoleDefintionName" equal to "OwnerOnlyUpdater" and call an "update space" API to update the space object, i.e., Fred's Space. Therefore, Fred would now be the only client who has access to call the "update" or "delete" methods for the affected object.

Figure 11:
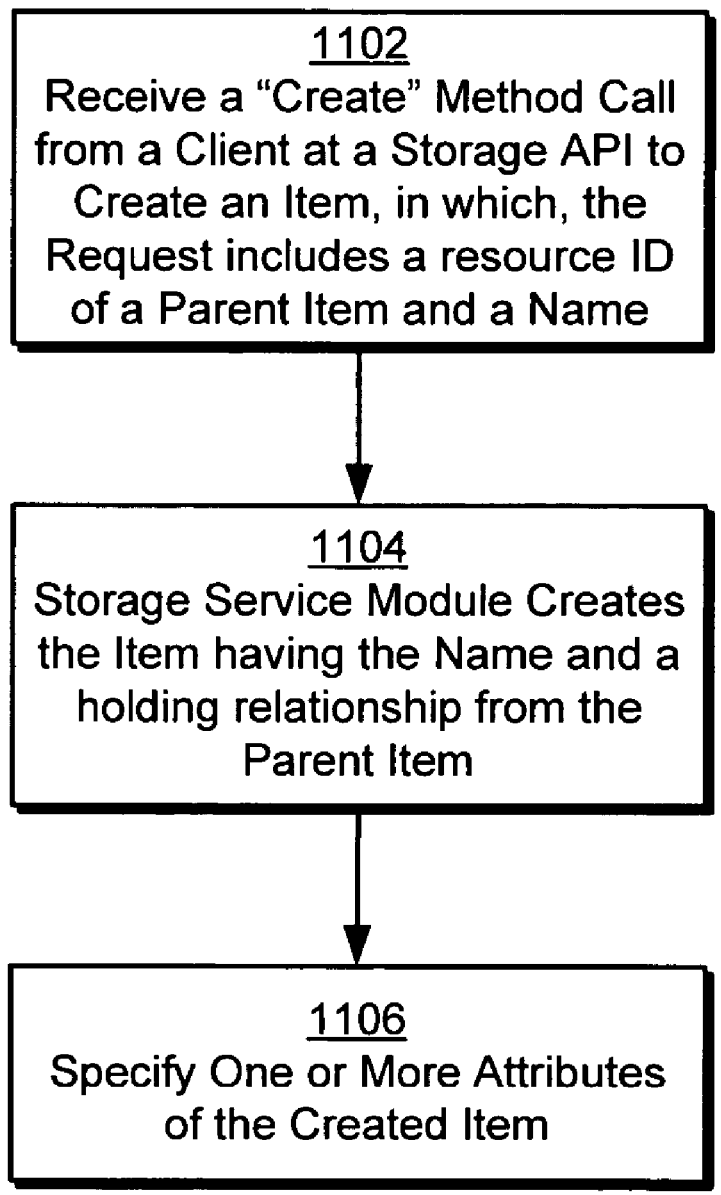
FIG. 11 is a flow diagram depicting a procedure in an exemplary implementation in which an item is created through interaction with a storage API.

FIG. 11 is a flow diagram depicting a procedure 1100 in an exemplary implementation in which an item is created through interaction with a storage API. The storage API may support a variety of methods for creating an item. For example, a storage API may receive a "create" method call from a client to create an item (block 1102). The request includes a resource ID from a parent object (e.g., space 302(1)) and a name. From the request, the storage service module 118(o) creates an appropriate item as well as a holding relationship from the resource ID to the newly created item (block 1104) item by implicitly calling a method called "AddRelationship". The name is assigned to a "name" field of the created relationship.

The storage service module then receives one or more communications via the storage API which specify one or more attributes of the created item (block 1106). For example, attributes of an item may have a variety of access restrictions, such as "read only", "read write", and "create only". These restrictions may hold true for each client that has permission to modify an item. "Read only" attributes may be viewed but can not be directly manipulated via "create" or "update" methods. "Read write" attributes may be updated if the client has appropriate permissions, i.e., has an appropriate role. "Create only" attributes may be viewed and may be directly manipulated via a "create" method. In an implementation, after an item is created, this attribute may not be modified. Although separate blocks (e.g., blocks 1104, 1106) are described, item creation and setting may be performed via one API call without departing from the spirit and scope thereof.

In some instances, a client may not wish to initialize all fields of an item when creating the new item. Therefore, the storage service module 118(o) may provide a mechanism that allows the client to specify that only certain fields should be written when the "create" method is called via the storage API 136(o). For example, the mechanism may be configured to allow the client to specify that only certain fields are written. This may be achieved by providing an additional Boolean field for each value type in an item. This field may share the same name as the value type, to which, it corresponds with the addition of the word "specified". For example, for a message item, a "MessageCountSpecified" field may be supplied in addition to a "MessageCount" field. These Boolean fields may therefore be initialized to indicate whether a valid value for the corresponding field is to be sent or retrieved from the object store 126.

Figure 12:
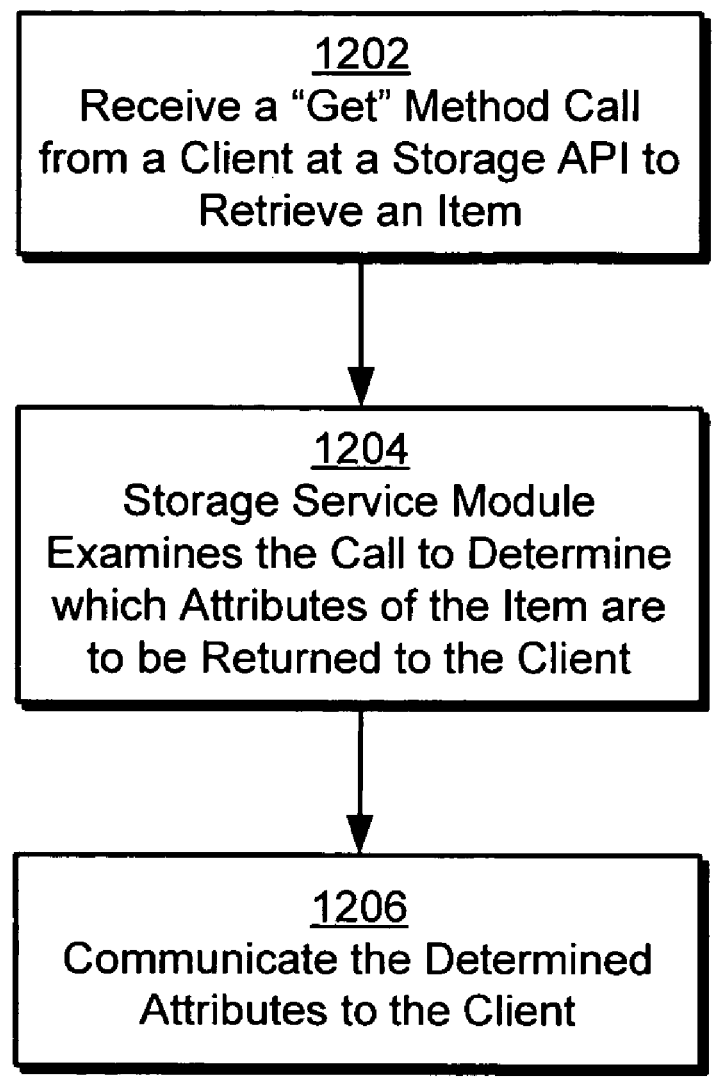
FIG. 12 is a flow diagram depicting a procedure in an exemplary implementation in which an item is retrieved through interaction with a storage API.

FIG. 12 is a flow diagram depicting a procedure 1200 in an exemplary implementation in which an item is retrieved through interaction with a storage API. A storage API receives a "get" method call from a client to retrieve a particular item (block 1202). A storage service module then examines the call to determine which attributes of the item are to be returned to the client (block 1204) and returns the determined attributes to the client (block 1206).

When an item is retrieved from the storage service module 118(o) via the "get" methods of the storage aPI 136(o), for example, the caller (i.e., the client) specifies an "ItemAttribute" class corresponding to the item type. The "ItemAttribute" class contains a collection of Boolean values that correspond to each field in the item. The Booleans in this class may be used the same way as the "specified" Boolean fields as previously described. For instance, a caller of the "get" API specifies which attributes are wanted from the method by setting the value for that attribute to "true". Therefore, the storage service module 118(o) may return those fields that are specified in this manner.

In another implementation, storage classes contain an attributes array as part of the class. This array may be used in the same way as an "ItemAttributes" array passed via the "get" method is used. Thus, the caller may use fields that have a corresponding attribute item set to "true". This is different from the previous described implementation discussed above, in that, instead of associating an attributes class with every item, there may be a "specified" Boolean field created for every value type field in the item. Therefore, instead of checking the specific field in the attributes class, the caller may check the "specified" field to determine if the field is valid. A variety of other implementations are also contemplated.

Figure 13:
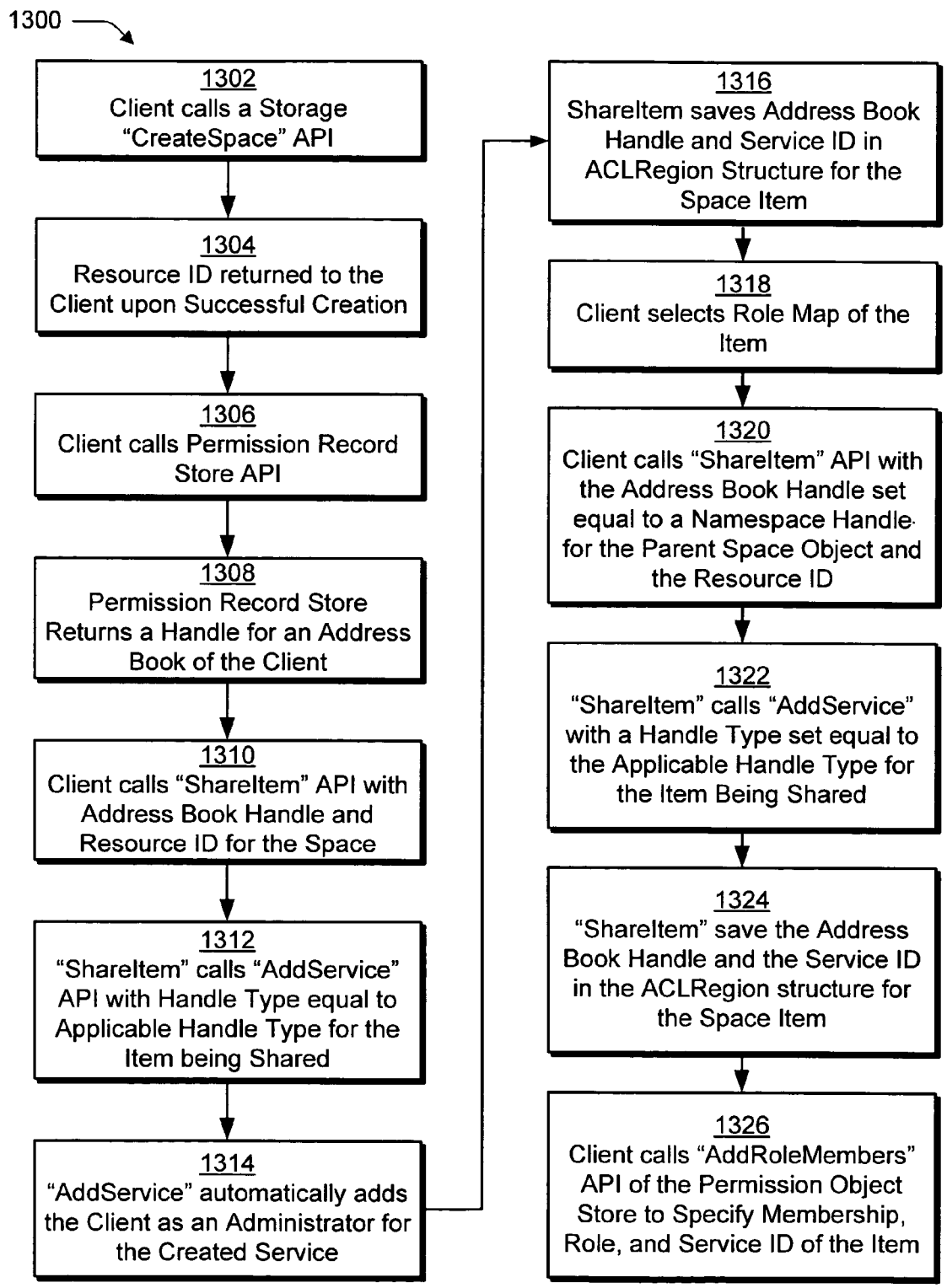
FIG. 13 is a flow diagram depicting a procedure in an exemplary implementation in which creation and sharing of items is described.

FIG. 13 is a flow diagram depicting a procedure 1300 in an exemplary implementation in which creating and sharing an item is described. Item sharing, and more particularly data 120(p) sharing, may be provided through use of roles and sharing services of the permission record store 610 and native storage functions provided by the storage service module 118(o). For example, individual client access rights to the items are registered as role memberships in the plurality of role maps 602(x).

As previously stated, clients can add client/role mappings via an "AddRoleMembers" method of the permission record store 610. The role map 602(x) associates one or more identities (e.g. unique client ID 604(x)) with roles (e.g., "Administrator"). For example, the permission record store 610 may support a variety of default roles, such as administrator, member, guest, banned, assistant administrator, contributor, and so on.

An item may be configured as a "personal space", such as "Fred's Space" as previously described and the space 302(1), 702(1) items of FIGS. 3 and 7, respectively. A personal space may be registered in the permission record store 610 and shared via a "ShareItem" API. The "ShareItem" API accepts the resource ID for the item being shared and the handle to the permission record store 610 where the role maps for the shared item are defined.

A space may be created and shared as follows. A client calls a storage "CreateSpace" API (block 1302). A resource ID is returned to the client upon successful creation (block 1304). The client also calls a permission record store API (block 1306) which returns a handle for an address book of the client (block 1308).

The client then calls a "ShareItem" API with the address book handle and the resource ID for the space (block 1310). "ShareItem" calls "AddService" API with a handle type set equal to application handle type for the item being shared (block 1312). Additionally, "AddService" automatically adds the client as an administrator for the created service (block 1314). ShareItem saves the Address book handle and service ID in ACLRegion structure for the space item (block 1316).

The storage service module 118(o) may be configured such that no explicit call is required to share a subcomponent of a space. For example, when a subcomponent (e.g., a leaf item) is created, the default behavior may be set to have the same role map as the parent item. Additionally, the storage service module may provide a user with the ability to set a role map for the object (block 1318). For instance, a dialog box may be output which enables the client to select objects and specify a mapping. This dialog may also provide the ability to specify role definitions.

Once the client has selected the role mapping of the storage object and the role map, the client may call "ShareItem" API with the address book handle set equal to a namespace handle for the parent space object (e.g., the namespace hand may be determined from ACLRegion structure of space item) and the resource ID (block 1320). "ShareItem" then calls "AddService" with a handle type set equal to the applicable handle type for the item being shared (block 1322). "ShareItem" then saves the address book handle and the service ID in ACLRegion structure for the space item (block 1324). The client may then call "AddRoleMembers" API of the permission object store 610 to specify membership, role, and service ID of the item (block 1326).

Figure 14:
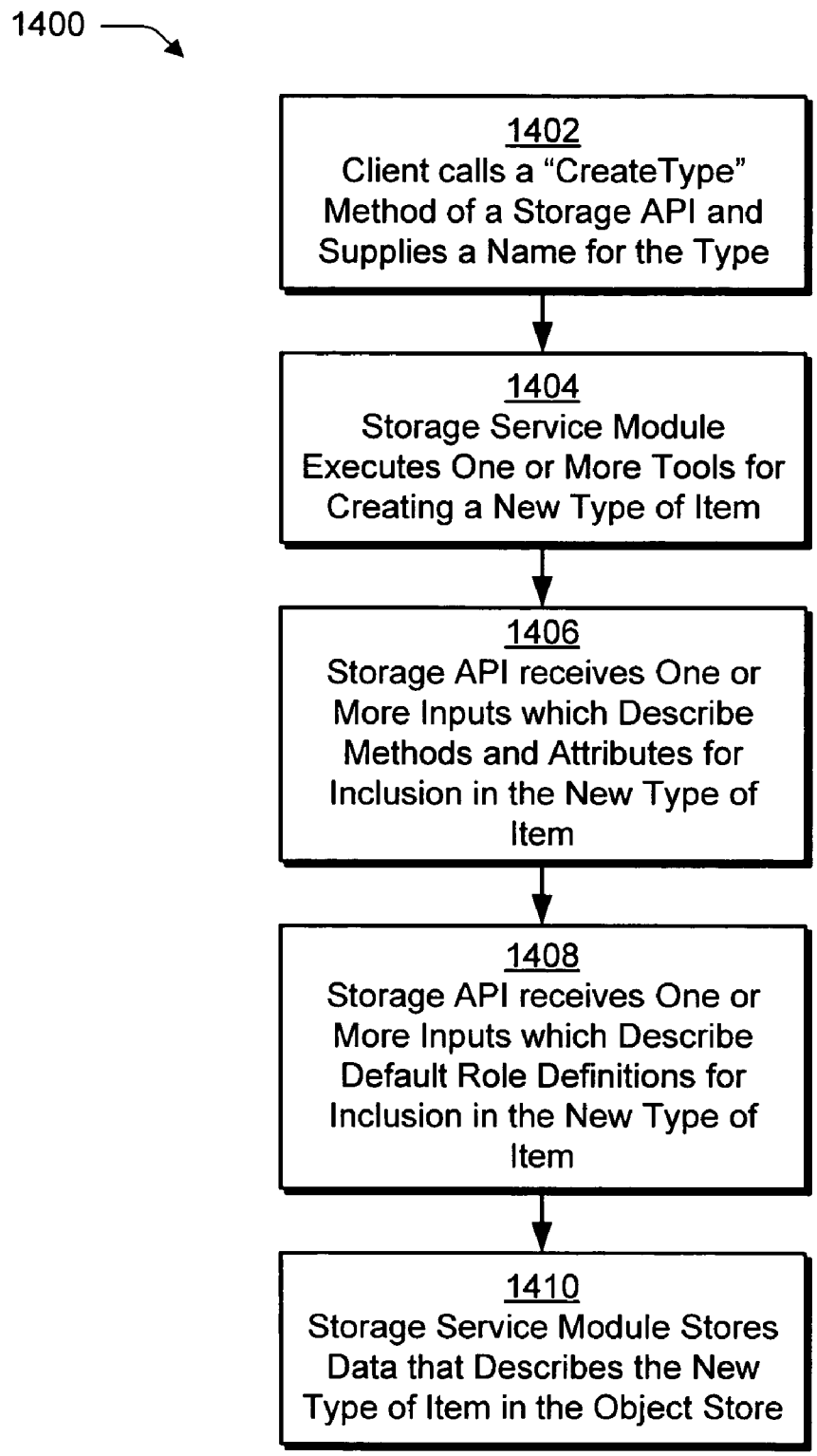
FIG. 14 is a flow diagram depicting a procedure in an exemplary implementation in which a new type of item is created by a client through interaction with one or more item creation tools provided via the storage API.

FIG. 14 is a flow diagram depicting a procedure in an exemplary implementation in which a new type of item is created by a client through interaction with one or more item creation tools provided via the storage API. A client calls a "CreateType" method of a storage API and supplies a name for the type (block 1402). For example, the client may desire to create a type of item configured to have properties which address the properties of a new type of photo format that can accept comments. In response to the call, the storage service module executes one or more tools for creating the new type of item (block 1404). The storage service module, for instance, may execute one or more of the plurality of tools 232(*t*) of FIG. 2 which is configured to receive inputs which specify a schema, methods, and attributes of the new item type.

The storage API, for instance, may receive one or more inputs which describe methods and attributes for inclusion in the new type of item (block 1406). For example, a client may specify which of the particular attributes and methods previously described will be included in the new type of item. The storage API may also receive one or more inputs which describe default role definitions for inclusion in the new type of item (block 1408). The default role definitions, for example, may specify which of the methods and attributes may be accessed by which roles. The storage service module then stores data that describes the new type of item in the object store (block 1410). Therefore, the client, as well as other clients which have access to the storage API 136(*o*), may later call this new type when it is described to create an item having that type as previously described in relation to FIG. 11.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-implemented method having computer instructions executable by a processor, comprising:
   examining a role map stored on a computing device to determine which of a plurality of roles are applicable to a request to interact with at least one of a plurality of items, wherein:
   the request is received via an application programming interface (API) that is available over a network; and
   an item is a fundamental object and includes basic properties, attributes, and item-associated methods, which are used by a storage service to manage the item; and
   each of the plurality of items references a single item of data through one of a plurality of relationships, the single item of data comprising a property, wherein each relationship stores a value corresponding to the property of the single item of data;
   permitting access to the at least one said item based on a role definition which describes differing access rights available for the at least one item based on a role applicable to the request; and
   enforcing a manipulation of the items and relationships to form a hierarchy to share and to reuse corresponding items of data, wherein the items are configured to inherit role definitions.

2. The method as described in claim 1, wherein the role definition describes an attribute of the item that is accessible by a first said role and is not accessible by a second said role.

3. The method as described in claim 1, wherein the role is applicable to the request based on an identity of a client that originated the request.

4. The method as described in claim 1, wherein at least two of the one or more said items reference a shared item of data.

5. The method as described in claim 1, wherein two or more of the plurality of items are configured to form a hierarchy.

6. The method as described in claim 1, wherein the request is configured as a method call selected from the group consisting of:
   a retrieve item call;
   a create item call;
   a create relationship between items call;
   a change access permission call;
   a role map change; a role definition change;
   update item;
   delete item; and
   a share item call.

7. The method as described in claim 1, wherein the request corresponds to a role selected from a group consisting of:
   an administrator;
   an owner; a creator;
   a guest; a contributor; and
   a member.

8. The method as described in claim 1, wherein:
   at least one said role is stored in a permission record store which is accessible to a storage service module that is executable to perform the permitting; and
   another said role is defined by the storage service module without accessing the permission record store.

9. A computer-implemented method having computer instructions executable by a processor, comprising:
   receiving a plurality of requests at an application programming interface stored on a computing device to access a respective one or more of a plurality of items, wherein:
   each request is sent over a network from a respective one of a plurality of clients;
   an item is a fundamental object and includes basic properties, attributes, and item-associated methods, which are used by a storage service to manage the item;
   one or more items reference at least one of a plurality of data;
   at least one item has a defined relationship with another item, the defined relationship comprising a value corresponding to a property of the another item, wherein the value of the defined relationship supersedes a value of the property of the another item;
   at least two items reference a shared item of data;
   another two items are configured to form a hierarchy;
   at least one item has a defined relationship with another item; and one or more items have one or more role definitions which describe respective access rights that are defined for one or more roles;

determining what access rights a client has to the item referenced by a corresponding request;

managing access of the plurality of clients to the one or more items based on a role is applicable to a respective client; and retrieving a role definition information about the item when the item is retrieved to permit a requesting client to determine how to utilize the plurality of data referenced by the item.

10. The method as described in claim 9, wherein:

at least one said role definition describes a method of the item that is accessible by one said role and is not accessible by another said role; and at least one said role definition describes an attribute of the item that is accessible by the one said role and is not accessible by the other said role.

11. The method as described in claim 9, wherein the client is a web server.

12. The method as described in claim 9, wherein at least one said request is configured as a method call selected from the group consisting of:

a retrieve item call;

a create item call;

a create relationship between items call;

a change access permission call; a role map change;

a role definition change; and a share item call.

* * * * *